(12) United States Patent
Kotha et al.

(10) Patent No.: US 11,023,330 B2
(45) Date of Patent: Jun. 1, 2021

(54) EFFICIENT SCHEDULING OF BACKUPS FOR CLOUD COMPUTING SYSTEMS

(71) Applicant: VMWARE, INC., Palo Alto, CA (US)

(72) Inventors: Venu Gopala Rao Kotha, Bangalore (IN); Anirudh Agarwal, Bangalore (IN); Sujeet Banerjee, Pune (IN); Shashidhar Narayana Krishnamurthy, Bangalore (IN); Sureshbabu Koyadan Chathoth, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 333 days.

(21) Appl. No.: 15/452,753

(22) Filed: Mar. 8, 2017

(65) Prior Publication Data

US 2018/0067819 A1    Mar. 8, 2018

(30) Foreign Application Priority Data

Sep. 2, 2016 (IN) .............................. 201641030166

(51) Int. Cl.
*G06F 11/14*    (2006.01)
*G06F 9/455*    (2018.01)

(52) U.S. Cl.
CPC ...... *G06F 11/1464* (2013.01); *G06F 9/45558* (2013.01); *G06F 11/1451* (2013.01); *G06F 11/1461* (2013.01); *G06F 2009/45562* (2013.01); *G06F 2009/45583* (2013.01); *G06F 2201/815* (2013.01)

(58) Field of Classification Search
CPC ............. G06F 11/1446; G06F 11/1448; G06F 11/1451; G06F 11/1458; G06F 11/1464; G06F 11/1461; G06F 11/1466; G06F 9/45558; G06F 2009/45562; G06F 2009/45583; G06F 2201/815; G06F 2201/81; G06F 2201/84

See application file for complete search history.

(56) References Cited

U.S. PATENT DOCUMENTS 5,854,754 A * 12/1998 Cabrera ................ G06F 9/5027
                                                      703/2
8,180,734 B1 * 5/2012 Thilmony ........... G06F 11/1464
                                                     707/640

(Continued)

OTHER PUBLICATIONS

IEEE 100, "The Authorative Dictionary of IEEE Standards Terms", Seventh Edition, Published 2000, p. 1179 'througput' definition. (Year: 2000).*

*Primary Examiner* — David T. Brooks
(74) *Attorney, Agent, or Firm* — Patterson + Sheridan, LLP (57) ABSTRACT

A system and method for backing up virtual machines are disclosed. To better use the backup resources, an optimal set of virtual machines needing backup during a time window is generated. The optimal set depends on a total time for backing up each virtual machine needing backup and a cost metric that indicates a cost of not backing up the virtual machine during the time window. The optimal set also meets various system constraints that reflect the backup resource limitations. Performing backups according to the optimal set limits the number of missed backups and the number of service level agreement violations, thereby improving the backup performance without costly additions to its infrastructure.

20 Claims, 7 Drawing Sheets

(56) References Cited

U.S. PATENT DOCUMENTS

| | | | |
|---|---|---|---|
| 8,959,509 B1* | 2/2015 | Sobel | G06F 9/4843 718/1 |
| 9,798,629 B1* | 10/2017 | Shilane | G06F 16/2365 |
| 10,083,094 B1* | 9/2018 | Thomas | G06F 11/1451 |
| 2007/0021998 A1* | 1/2007 | Laithwaite | G06Q 10/06 705/7.13 |
| 2008/0320482 A1* | 12/2008 | Dawson | G06F 9/5027 718/104 |
| 2009/0300633 A1* | 12/2009 | Altrichter | G06F 9/4856 718/103 |
| 2009/0320029 A1* | 12/2009 | Kottomtharayil | G06F 9/505 718/102 |
| 2010/0057519 A1* | 3/2010 | Dorai | G06F 9/5033 705/7.13 |
| 2010/0274767 A1* | 10/2010 | Irisawa | G06F 11/1469 707/654 |
| 2011/0161964 A1* | 6/2011 | Piazza | G06F 9/4881 718/102 |
| 2011/0191777 A1* | 8/2011 | Bansal | G06F 9/46 718/102 |
| 2011/0313974 A1* | 12/2011 | Chen | G06F 11/1451 707/654 |
| 2012/0096470 A1* | 4/2012 | Bartfai-Walcott | G06F 9/4881 718/103 |
| 2012/0109844 A1* | 5/2012 | Devarakonda | G06Q 10/067 705/348 |
| 2012/0216203 A1* | 8/2012 | Doyle | G06F 9/4881 718/102 |
| 2013/0262925 A1* | 10/2013 | Dhanalakoti | G06F 11/1415 714/16 |
| 2013/0290265 A1* | 10/2013 | Hari | G06F 11/1461 707/654 |
| 2014/0143610 A1* | 5/2014 | Nakatsugawa | G06F 11/008 714/47.3 |
| 2015/0234713 A1* | 8/2015 | Shimada | G06F 11/1451 714/19 |
| 2016/0342481 A1* | 11/2016 | Nanivadekar | G06F 11/1469 |
| 2016/0342483 A1* | 11/2016 | Klingenberg | G06F 11/1461 |
| 2017/0031715 A1* | 2/2017 | Willis | G06F 9/4881 |
| 2017/0168901 A1* | 6/2017 | Tsao | G06F 11/1451 |
| 2017/0364415 A1* | 12/2017 | Formato | G06F 11/1464 |

* cited by examiner

EFFICIENT SCHEDULING OF BACKUPS FOR CLOUD COMPUTING SYSTEMS

RELATED APPLICATIONS

Benefit is claimed under 35 U.S.C. 119(a)-(d) to Foreign Application Ser. No. 201641030166 filed in India entitled "EFFICIENT SCHEDULING OF BACKUPS FOR CLOUD COMPUTING SYSTEMS", on Sep. 2, 2016, by VMware, Inc., which is herein incorporated in its entirety by reference for all purposes.

BACKGROUND

A cloud computing data center of a cloud provider has a large number of hosts supporting many, perhaps thousands, of virtual machines (VMs) to meet the requirements of its cloud customers. The cloud provider performs various services for its cloud customers including data protection service (DPS). Parameters for the DPS, which include backup and recovery, are defined in service level agreements (SLAs) that cloud customers enter into with the cloud provider. Parameters are defined in terms of RTO (Recovery Time Objective) and RPO (Recovery Point Objective). When SLAs are violated, there are several consequences. First, customer confidence about, deploying business critical workloads in the cloud is lowered. Second, cloud providers may have to pay penalties defined in the SLAs for violating the SLAs.

The cloud provider supports RPO and RTO SLAs in various ways. To support RPO SLAs, customers are allowed to select a scheduling window during which their production critical VMs should be backed up. The DPS performs backups for the customer VMs according to this scheduling window. To support RTO SLAs, customers are provided with self-service options to restore their VMs from any of the available backup images of the VMs. The DPS performs the data transfers fim restoring the VM according to the options selected by the customers.

As the number of cloud customers scales up to hundreds, thousands, and more, the RPO and RTO SLAs may become difficult to satisfy consistently for all customers. One reason is that customers often schedule their backups during the same off-peak hours, e.g., 12:00 AM to 6:00 AM, and the expansion of hardware resources to meet the computational demands during such periods quickly becomes cost prohibitive and higher than the SLA violation costs.

SUMMARY

Embodiments provide an effective and efficient backup process, which improves backup throughput and reduces the number of SLA violations. According to embodiments, to better use backup resources of a cloud computing center or more generally, a data center, an optimal set of virtual machines needing backup during a time window is generated. The optimal set depends on a total time for backing up each virtual machine needing backup and a cost metric that indicates a cost of not backing up the virtual machine during the time window. The optimal set also meets various system constraints that reflect the backup resource limitations. Performing backups according to the optimal set limits the number of missed backups and the number of service level agreement violations, thereby improving the backup performance without costly additions to its infrastructure.

A method of backing up VMs according to an embodiment, includes the steps of receiving requests for backing up a plurality of VMs during a time window, predicting a total backup time for each of the VMS, predicting a cost metric for failing to backup each of the VMs in the time window, determining an optimal set of the VMs to backup during, the time window based on the predicted total backup times and predicted cost metrics for each of the VMs, and backing up the VMs in the optimal set during the time window. The VMs in the optimal set have an aggregated backup time that equals or exceeds the time window, and the optimal set of the VMs has a largest size and a lowest total predicted cost ineuric among all sets of the VMs having an aggregated backup time that equals or exceeds the time window.

Further embodiments include, without limitation, a non-transitory computer-readable storage medium that includes instructions for a processor to carry out the above method and a computer system that includes a processor programmed to carry out the above method.

DETAILED DESCRIPTION

Figure 1:
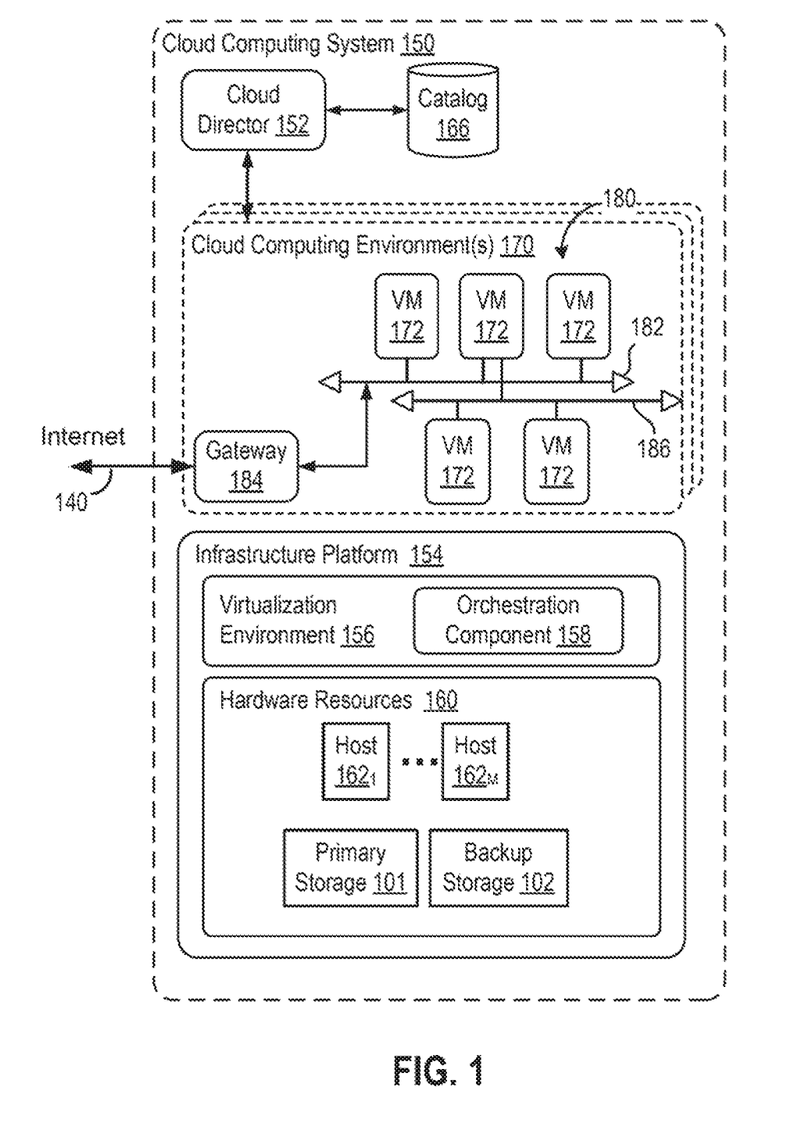
FIG. 1 is a block diagram of a cloud computing center in which embodiments may be practiced.

FIG. 1 is a block diagram of a cloud computing system 150 in which one or more embodiments may be utilized. Cloud computing system 150 is configured to dynamically provide an enterprise (or users of an enterprise) with one or more virtual data centers 170 in which a user may provision VMs 172, deploy multi-tier applications on VMs 172, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_T$ to $162_N$), storage resources including primary storage 101 and backup storage 102, and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a Web applications or to modify (e.g., scale) a currently running Web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g, running in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VMs 172 can be created, stored, and operated, enabling complete abstraction between the consumption of infrastructure service and underlying resources. VMs 172 may be configured as abstractions of processor, memory, storage, and networking resources of hardware resources 160.

Virtual data center 180 includes one or more virtual networks 182 used to communicate between VMs 172 and managed by at least one networking gateway component (e.g, gateway 184), as well as one or more isolated internal networks 186 not connected to gateway 184. Gateway 184 (e.g., executing as a virtual appliance) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing.

According to embodiments, orchestration component 158 triggers a backup to be performed by a data protection server according to the SLAs of the tenants. As part of the backup SLA, each tenant defines: (1) retention period (for how many days the backed up data must be retained); (2) time window in which backup will run automatically; and (3) recurrence policy (how frequently the backup should run: daily, weekly, or monthly). Violation of any of these policies would result in violation costs ter the cloud provider.

Figure 2:
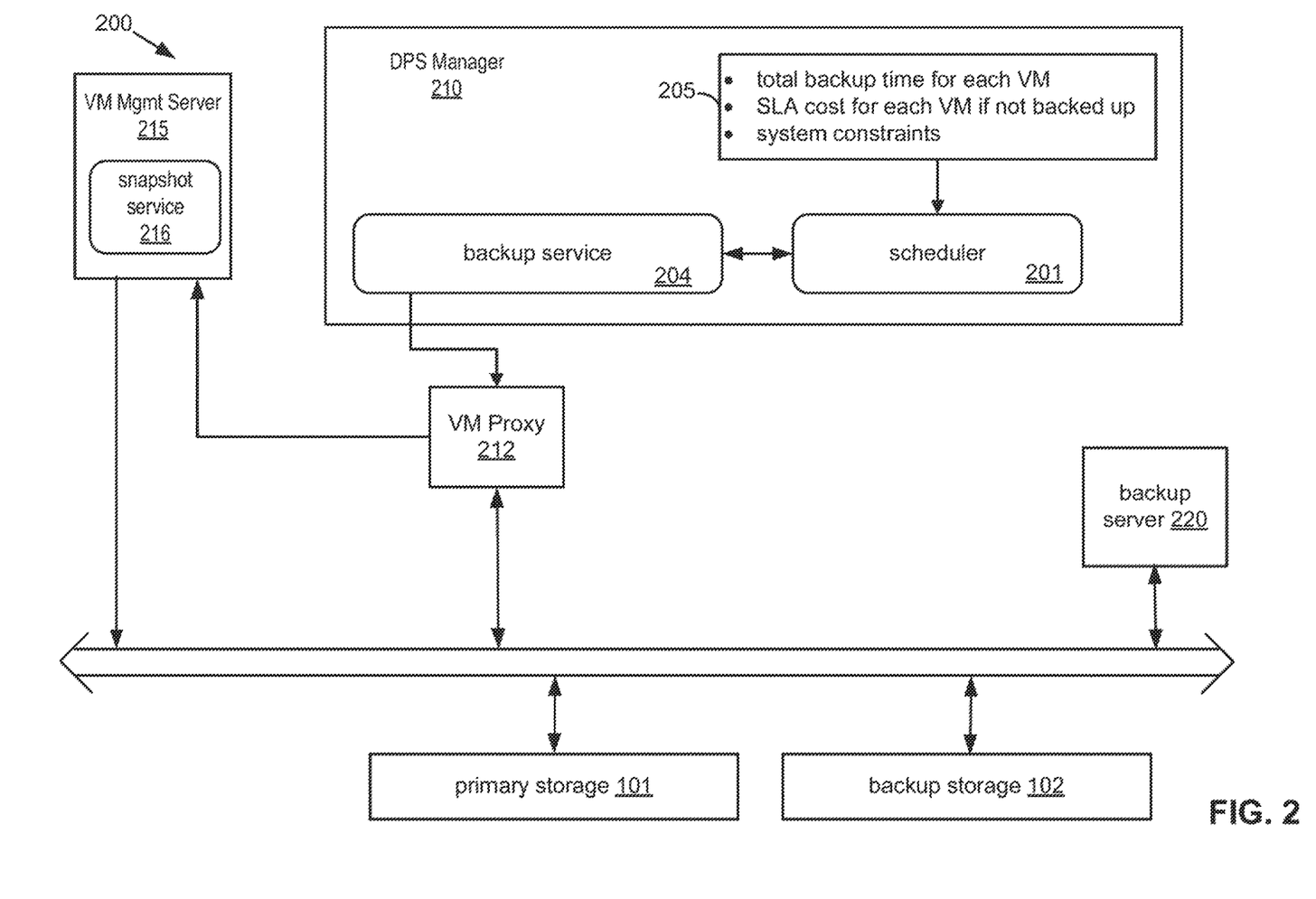
FIG. 2 is a schematic diagram that depicts a backup process for a plurality of VMs running in the cloud computer center.

FIG. 2 is a schematic diagram that depicts a backup process for a plurality of VMs running in the cloud computer center, when the backup is triggered by orchestration component 158. In one embodiment, the backup process depicted in FIG. 2 is carried out by a data protection service (DPS) manager 210 in conjunction with a VM management server 215, both of which are parts of orchestration component 158 of cloud computing system 150. DPS manager 210 includes a scheduler 201 that schedules backups of a tenant according to the tenant's backup SLA and a backup service 204 that coordinates backup operations with one or more backup agents running in hosts 162. In one embodiment, the backup agent is a VM running in hosts 162, and is referred to herein as a VM proxy.

In response to a backup request which is triggered by scheduler 201 in accordance with the tenant's backup SLA, backup service 204 launches one or more backup operations, each of which is a concurrent instance of the backup operation described below in conjunction with FIG. 3, using one or more VM proxies (one of which is depicted in FIG. 2 as VM proxy 212). Once data blocks that need to be backed up are identified (e.g., data blocks that have been modified since the last backup, referred to herein as "changed blocks"), a backup server 220, e.g., a deduplication backup server, updates the backup images of the VMs stored in backup storage 102 with the changed blocks.

Figure 3:
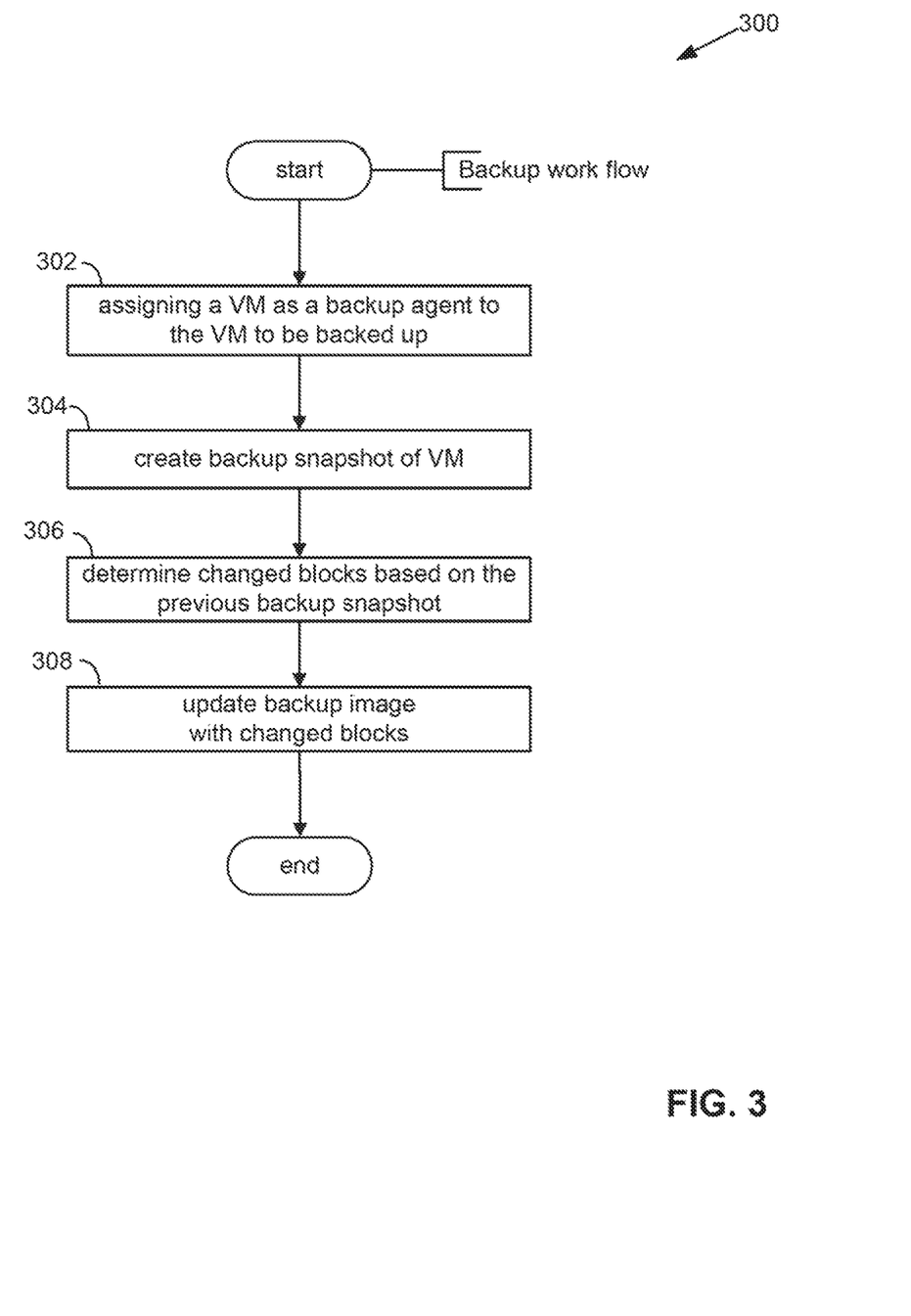
FIG. 3 depicts a backup process for an individual VM according to an embodiment.

FIG. 3 depicts a backup process 300 for an individual VM according to an embodiment. To perform the backup, in step 302, backup service 204 assigns one of the virtual machines as VM proxy 212 for the VM to be backed up. In response. VM proxy 212 communicates with a snapshot service 216 in VM management server 215 to take a backup snapshot of the VM. Snapshot service 216 takes the backup snapshot of the VM in step 304. Then, VM proxy 212 in step 306 determines data blocks of the VM that have changed since the most recent backup snapshot, and in step 308 updates the backup image of the VM in backup storage 102 with the changed blocks determined in step 306.

During the backup process, scheduler 201 monitors data 205 generated by backup service 204 to help backup service 204 make scheduling decisions. Generated data 205 includes (a) a predicted total backup time for each VM needing backup during the next scheduling window, (b) a predicted SLA violation cost (cost metric) for each VM if not backed up, and (c) a number of system constraints, which reflect limitations in the data center. System constraints include the following:

Maximum number of possible IO connections supported by the backup server;

Maximum IO read and write rates supported by the backup server;

Maximum IO reads of the primary storage;

Network bandwidth between the primary storage and the backup storage;

CPU cycles available on the backup server;

CPU cycles available on the hosts; and

Maximum threads supported by the backup agent.

It is desirable to maximize the number of VMs backed up and reduce or eliminate the service agreement violations without expanding the resources of the data center, which requires additional infrastructure costs.

Figure 4:
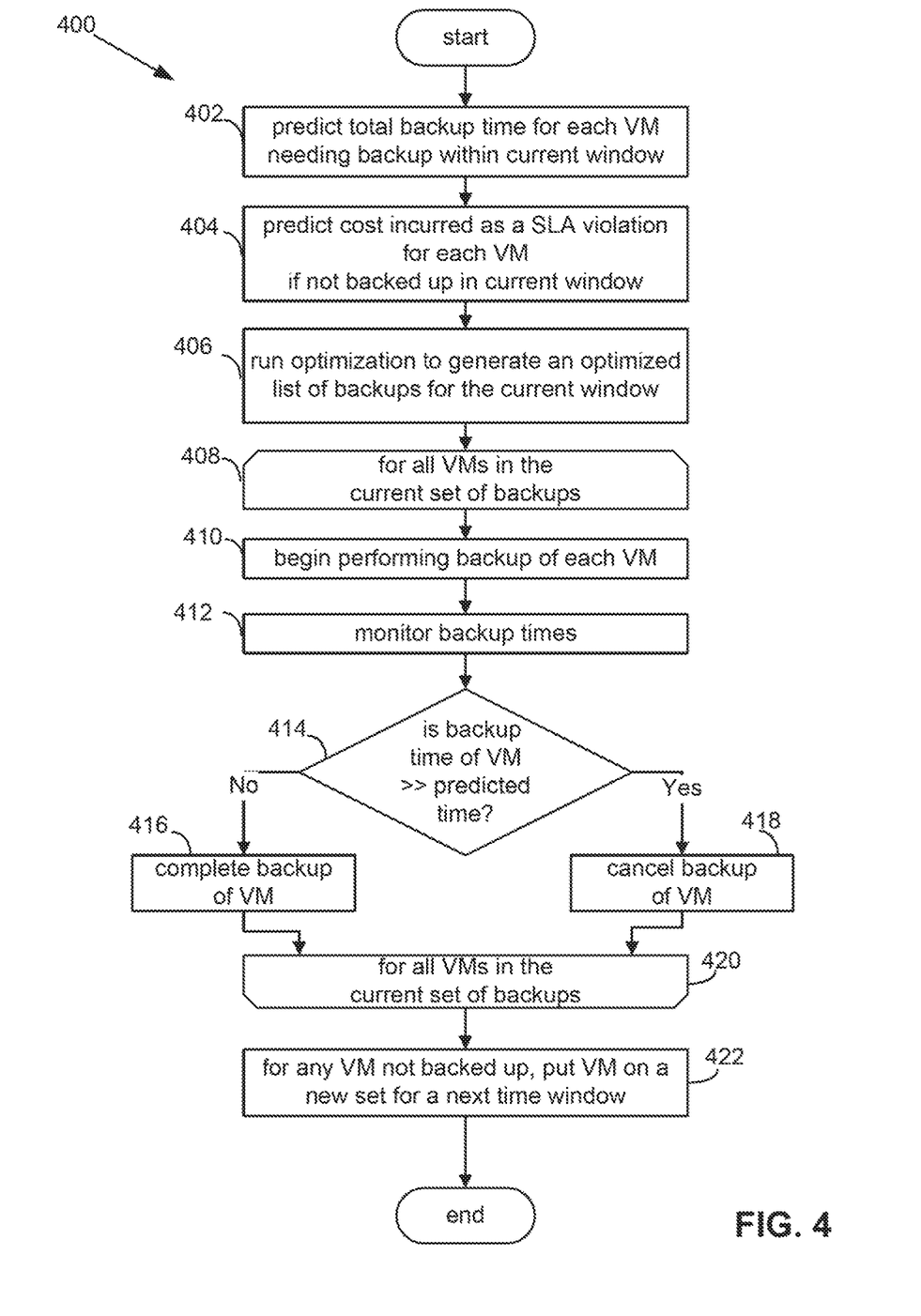
FIG. 4 depicts operation of the scheduler in FIG. 4 according to an embodiment.

FIG. 4 depicts operation 400 of the scheduler of FIG. 2 according to an embodiment. The job of the scheduler is to decide on an optimal set of VMs taken from the VMs needing backup in the next scheduled time window. The optimal set is the one that provides the most VM backups and least SLA violation costs during the time window in view of the constraints noted above. Or equivalently, the optimal set is one that provides the lowest average SLA violation cost during the time window and meets any imposed system constraints.

In step 402 of FIG. 4, the scheduler predicts a total backup time for each VM needing backup within a current time window. In step 404, the scheduler predicts a metric representing the cost of an SLA violation for each VM needing backup if the VM is not backed up in the current time window. In step 406, the scheduler runs an optimization based on the backup times and the cost metrics of the VMs to determine an optimal set of backups for the current time window. Steps 408-418 depict a loop in which backup of each VM is performed. In step 410, the backup operation is started for the VMs in the optimal set. During the backup operation, the backup time of the VM is monitored and if the backup time is much greater than the predicted backup time, as determined in step 412, then the backup operation for the VM is cancelled in step 418, in one embodiment, if the backup time exceeds the predicted time by a certain percentage, the backup operation is cancelled. If the backup time is commensurate with the predicted backup time, then the backup operation is allowed to complete in step 416. Following step 420, the backup of all VMs in the optimal set is continued in the same manner, in step 422, the VMs whose backup was cancelled submit backup requests and are considered for backup during the next time window. In one embodiment, the backup operations of the VMs in the optimal set are carried out concurrently, but it should be understood that the level of concurrency may be limited by system constraints.

Figure 5:
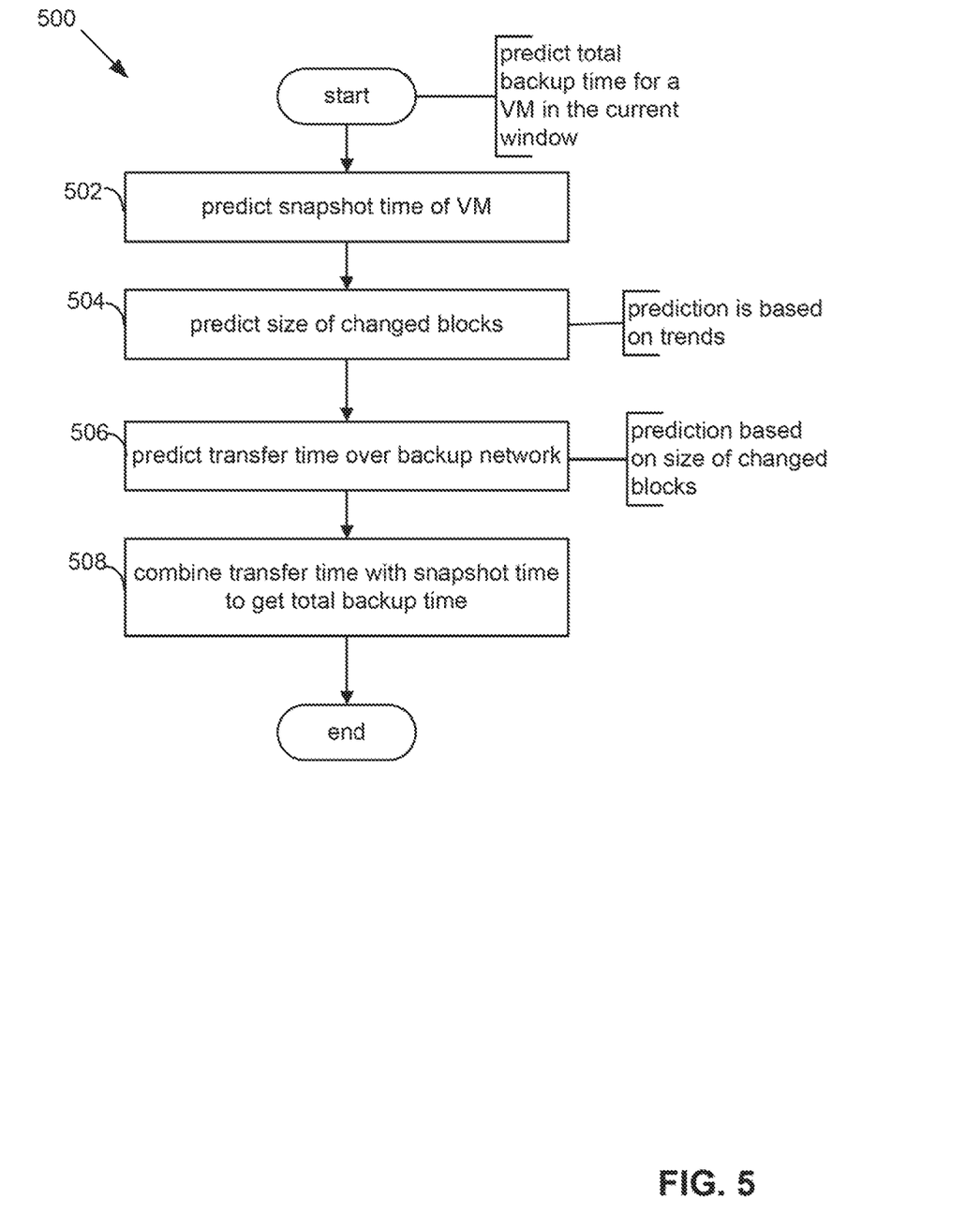
FIG. 5 depicts a method of predicting total backup time for a VM, according to an embodiment.

FIG. 5 depicts a method 500 for predicting a total backup time, as described in step 502 of FIG. 5, for VM, according to an embodiment. In step 502, the snapshot time of a particular VM is predicted. The snapshot time includes time for quiescing the particular VM. Quiescing includes a process of bringing the on-disk data of a VM to a suitable state for backup. This includes operations such as flushing dirty buffers from the cache of an operating system running on the VM and other high-level application specific tasks.

Tools such as guest monitoring in the hypervisor or guest OS native commands can be helpful for predicting the snapshot time. In one embodiment, to predict the time to flush to disk the dirty buffers of a guest operating system, the size of the buffers and previous backup trends of the VM are used to help generate the predicted time. The size of the buffers is available from guest OS commands such as the top command, when the guest OS is a Linux OS. In the case of a Microsoft application being run as a guest application, the Microsoft volume shadow copy service can collect metadata from which the size of the dirty I/O buffers can be estimated, which can in turn be used to predict the snapshot time.

In step 504, the size of changed blocks is predicted for the particular VM. This prediction, is performed based on trends derived from previous backups for the particular VM using an extrapolation algorithm.

In step 506, the time to transfer the changed blocks over the data transfer network is predicted based on a current backup speed. For example, if size of the changed blocks of a VM is estimated to be 2 GB and the current backup speed is 600 MB/min, then the predicted transfer time is about 3.34 minutes.

In step 508, the sum of the snapshot time and transfer time for the changed blocks is computed to give a predicted total backup time for the VM.

Figure 6:
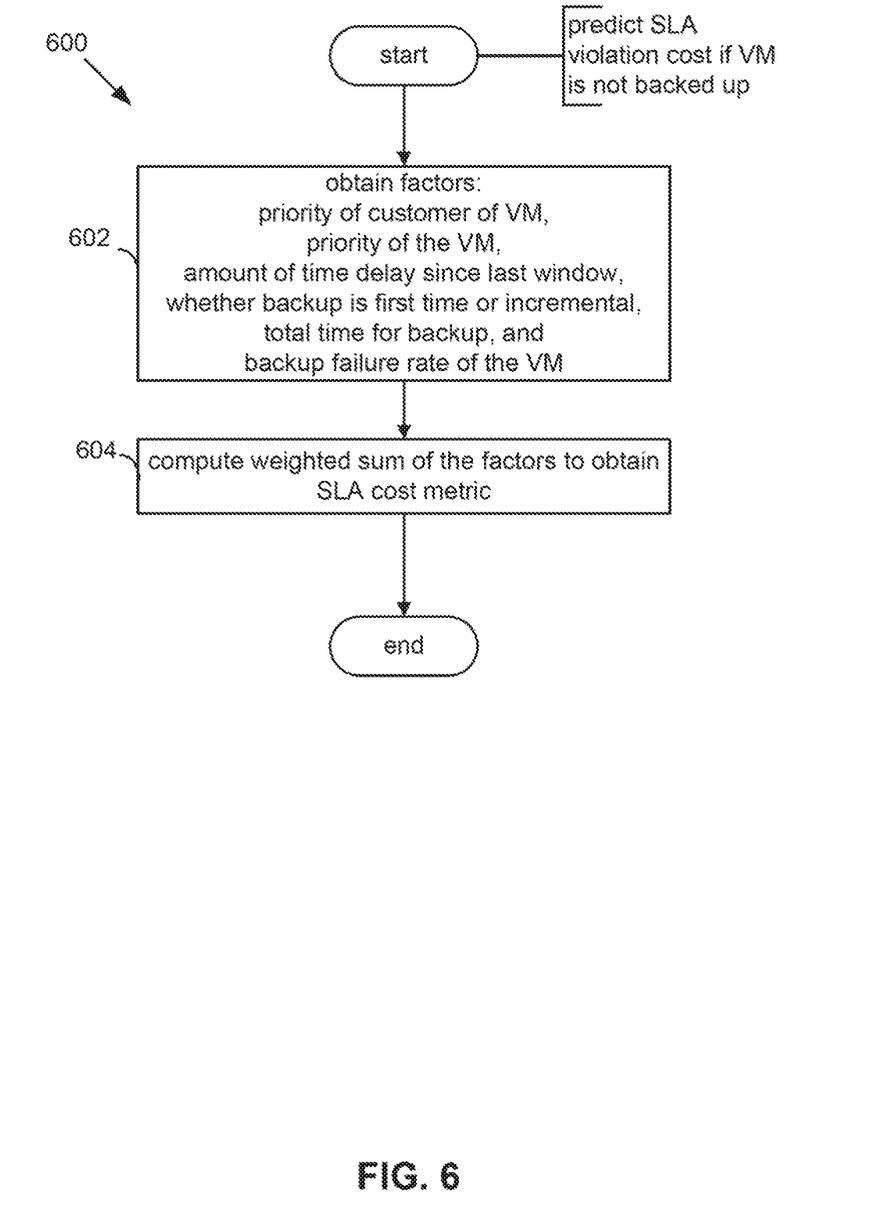
FIG. 6 depicts a method of computing an SLA cost metric, according to an embodiment.

FIG. 6 depicts a method 600 of computing an SLA violation cost metric, as described in step 504, according to an embodiment. In step 602, a number of factors are collected. These factors include a priority of the customer that owns the VM, a priority of the VM, an amount of time delayed from the scheduled backup window, a flag indicating whether the backup is a first time backup or an incremental backup, a total time for the VM backup and a backup failure rate of the VM. These factors are combined to obtain the SLA cost of skipping the backup of the VM. In one embodiment, the factors are combined by computing a weighted sum of the factors.

For example, the if the factors collected include customer priority, VM priority, Backup Type and Failure Rate, the weighted sum of the factors is calculated as (Customer Priority*VM Priority*Backup Type Weight*Failure Rate), the customer priority having weights 3, 2 or 1 with the 3 being the weight for the highest priority customer, the VM priority having weights 3, 2 or 1 with 3 being the weight for the highest priority VM, incremental backup having a weight of 1.0 and full backup having a weight of 0.5, and failure rate of 20%-30% having, a weight of 0.7 (and likewise for the other failure rates). To obtain the SLA cost, the base cost for SLA violation (e.g., $1 per minute per VM) is multiplied by the weighted sum of the factors. Thus, the SLA cost for a priority 2 VM with a failure rate of 10% and a priority 3 customer is 60*(3*2*0.5*0.9)=$162. Similarly, the SLA cost of a priority 3 VM with a failure rate of 30% and a priority 1 customer is 60*(1*3*1*0.7)=$126.

Having generated the total backup time and the cost metric for each VM needing a backup during the next time window, the scheduler now has the needed information to run an optimization to determine an optimal set of VMs to be backed up on the next time window.

Figure 7:
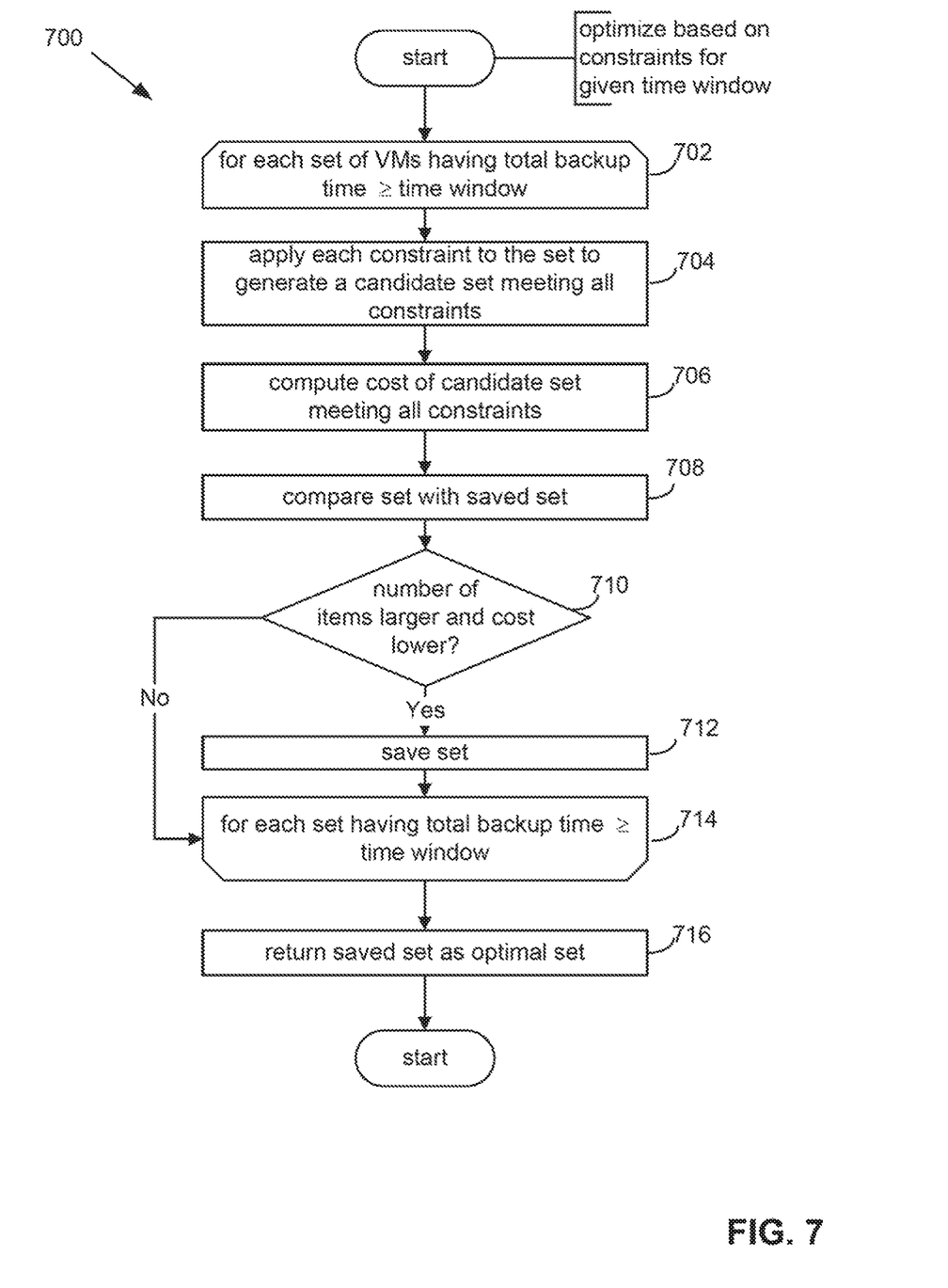
FIG. 7 depicts a method of running an optimization to generate an optimal set of VMs to be scheduled for backup, according to an embodiment.

FIG. 7 depicts details of a method 700 for running an optimization to determine the optimal set, as depicted in step 506, according to an embodiment. Steps 702 and 714 form an iteration over all of the sets of VMs having a backup time greater than or equal to the given time window, each such set being a candidate set. This means that only those sets of VMs having a backup time equal to or greater than the time window are considered; sets of VMs having a total backup time less than the time window are guaranteed to be backed up within the window and are thus not included in the optimization. In step 704, each constraint in the list of system constraints is applied to a candidate set to generate a final candidate set that meets all of the system constraints. In one embodiment, the system constraints in the list are applied in the sequential order of the list, with the second constraint being applied to the list that meets the first constraint and so on.

In one embodiment, the system constraints include a given number of threads that are available to the backup agent, a maximum number of backup snapshots allowed in primary storage 101 in FIG. 2, a maximum number of connections of backup storage 102 in FIG. 2, a maximum number of backup snapshots allowed in the data center, and a maximum number of connections to backup storage 102 in FIG. 2.

In step 706, the cost metric of the final candidate set is computed based on the costs computed for each VM in FIG. 6. Thus, if the final candidate set has four VMs, the cost metric of the final candidate set is the sum of the cost metrics of each of the four VMs.

In step 708, the cost and size (i.e., the number of VMs in the set) of the final candidate set is compared to a saved set, which is initially empty and has an arbitrarily large cost. If the size of the final candidate set is longer and the cost is lower than the saved set, as determined in step 701, then the final candidate set is saved in step 712 and becomes the set to be compared against in another iteration. The last saved set is the optimal set, i.e., the set that meets the time window constraint, meets till of the system constraints and has the lowest cost and largest number of items than any other set considered by the iteration 702-714. Equivalently, the optimal set meets all of the system constraints and has the lowest average cost, which is the aggregated cost of the set divided by the number of items in the set. In some embodiments, ordering the elements in the candidate set from lowest cost VM to highest cost VM can improve the optimization.

In step 716, the saved set s returned as the optimal set of VMs to be scheduled for backup.

In one embodiment, a min 0-1 knapsack algorithm is employed to determine the best set for the given time window and all system constraints. This is a general algorithm that selects a set that minimizes a cost subject to one or more constraints and can be implemented with dynamic programming techniques which minimize the time to find the optimal set.

Table 1 below gives the predicted times to backup and SLA violation costs for a 60 minute backup window.

TABLE 1

| Customer | VM Name | Time to backup | Cost |
|---|---|---|---|
| Customer1 | VM1 | 60 min | 100 |
| Customer1 | VM2 | 10 min | 20 |
| Customer2 | VM3 | 2 min | 10 |
| Customer2 | VM4 | 80 min | 125 |

If the set of backups, chosen without the process of FIGS. 5-8, is [VM4, VM1, VM2, VM3] and the aggregated cost is 125. The average cost is also 125 assuming one backup for VM4 completes. Also, there are three missed backups and three SLA violations. The missed backups must be rescheduled. However, if the processes of FIGS. 5-8 are employed, then the selected set is [VM3, VM2, VM1, VM4]. The aggregated cost is 130 and the average cost is 43 (130/3), assuming the first three backups complete and one backup is missed. Therefore, the maximum number of VMs is backed up for the minimum cost.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing, these operations. The apparatus may be specially constructed for specific required purposes, or it may be a general purpose computer selectively activated or configured by a computer program stored in the computer. In particular, various general purpose machines ma be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read b a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventions(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of backing up virtual machines (VMs), comprising:
   receiving requests for backing up a plurality of VMs during a time window;
   predicting a total backup time for each of the VMs, wherein predicting a total backup time for a VM comprises predicting an amount of time to prepare the VM for backup and an amount of time to backup the VM;
   predicting a cost metric for failing to backup each of the VMs in the time window, the cost metric corresponding to a service level agreement (SLA) of each of the VMs;
   determining an optimal set of the VMs to backup during the time window based on the predicted total backup times and predicted cost metrics for each of the VMs, wherein the VMs in the optimal set have an aggregated predicted total backup time that equals or exceeds the time window, and the optimal set of the VMs has a largest size and a lowest total predicted cost metric among all sets of the VMs having an aggregated predicted total backup time that equals or exceeds the time window; and
   backing up one or more of the VMs in the optimal set during the time window.

2. The method of claim 1, wherein predicting a total backup time for a VM includes:
   predicting a snapshot time of the VM;
   predicting a size of changed blocks for the VM;
   predicting a transfer time for the VM based on the size of the changed blocks; and
   generating the total backup time for the VM by combining the transfer time and snapshot time for the VM.

3. The method of claim 1, wherein predicting a cost metric for failing to backup a VM includes generating the cost metric by combining a plurality of factors including the total time for backing up the VM.

4. The method of claim 3, wherein the plurality of factors further includes:
   a priority of the VM;
   a priority of a customer that owns the VM;
   an amount of time since a last backup scheduled backup window;
   a flag indicating whether or not the backup is a first time backup or an incremental backup; and
   a failure rate of backing up the VM.

5. The method of claim 1, wherein determining an optimal set of the VMs to backup includes:
   (a) generating a candidate set of the VMs that meets a plurality of constraints;
   (b) computing a total cost metric of the VMs in the candidate set;
   (c) comparing the candidate set to a saved set having a size and a total cost metric; and
   (d) saving the candidate set if the candidate set has a size that is larger and a total cost metric that is lower than the size and the total cost metric, respectively, of the saved set; and
   (e) returning the saved set as a current optimal set and repeating steps (a) through (e) for all sets of the VMs that meet the constraints.

6. The method of claim 1, wherein backing up the one or more of the VMs in the optimal set includes, for each of the VMs in the optimal set:
   assigning a VM as a backup agent for the VM;
   creating a current backup snapshot for the VM;
   examining a previous backup snapshot to determine changed blocks of the VM; and
   updating a backup image of the VM with the changed blocks.

7. The method of claim 1, further comprising, while attempting to back up each of the VMs in the optimal set:
   monitoring a time for backing up the VM; and
   if the monitored time for backing up the VM exceeds the predicted total backup time for the VM, canceling the backup of the VM and requesting backup of the VM at a later time.

8. A non-transitory computer-readable medium that stores instructions that are executable by a computer system, wherein the instructions, when executed, cause the computer system to perform a method of backing up virtual machines (VMs), wherein the method comprises:
   receiving requests for backing up a plurality of VMs during a time window;
   predicting a total backup time for each of the VMs, wherein predicting a total backup time for a VM comprises predicting an amount of time to prepare the VM for backup and an amount of time to backup the VM;
   predicting a cost metric for failing to backup each of the VMs in the time window, the cost metric corresponding to a service level agreement (SLA) of each of the VMs;
   determining an optimal set of the VMs to backup during the time window based on the predicted total backup times and predicted cost metrics for each of the VMs, wherein the VMs in the optimal set have an aggregated predicted total backup time that equals or exceeds the time window, and the optimal set of the VMs has a largest size and a lowest total predicted cost metric among all sets of the VMs having an aggregated predicted total backup time that equals or exceeds the time window; and
   backing up one or more of the VMs in the optimal set during the time window.

9. The non-transitory computer-readable medium of claim 8, wherein predicting a total backup time for a VM includes:
   predicting a snapshot time of the VM;
   predicting a size of changed blocks for the VM;
   predicting a transfer time for the VM based on the size of the changed blocks; and
   generating the total backup time for the VM by combining the transfer time and snapshot time for the VM.

10. The non-transitory computer-readable medium of claim 8, wherein predicting a cost metric for failing to backup a VM includes generating the cost metric by combining a plurality of factors including the total time for backing up the VM.

11. The non-transitory computer-readable medium of claim 10, wherein the plurality of factors further includes:
a priority of the VM;
a priority of a customer that owns the VM;
an amount of time since a last backup scheduled backup window;
a flag indicating whether or not the backup is a first time backup or an incremental backup; and
a failure rate of backing up the VM.

12. The non-transitory computer-readable medium of claim 8, determining an optimal set of the VMs to backup includes:
(a) generating a candidate set of the VMs that meets a plurality of constraints;
(b) computing a total cost metric of the VMs in the candidate set;
(c) comparing the candidate set to a saved set having a size and a total cost metric; and
(d) saving the candidate set if the candidate set has a size that is larger and a total cost metric that is lower than the size and the total cost metric, respectively, of the saved set; and
(e) returning the saved set as a current optimal set and repeating steps (a) through (e) for all sets of the VMs that meet the constraints.

13. The non-transitory computer-readable medium of claim 8, wherein backing up the one or more of the VMs in the optimal set includes, for each of the VMs in the optimal set:
assigning a VM as a backup agent for the VM;
creating a current backup snapshot for the VM;
examining a previous backup snapshot to determine changed blocks of the VM; and
updating a backup image of the VM with the changed blocks.

14. The non-transitory computer-readable medium of claim 8, wherein the instructions further cause the computer to, while attempting to back up each of the VMs in the optimal set:
monitoring a time for backing up the VM; and
if the monitored time for backing up the VM exceeds the predicted total backup time for the VM, canceling the backup of the VM and requesting backup of the VM at a later time.

15. A system for backing up virtual machines, the system comprising:
a plurality of hosts supporting a plurality of virtual machines (VMs);
a backup storage configured to store backup data for the plurality of VMs;
a data backup server configured to:
receive requests for backing up a plurality of VMs during a time window;
predict a total backup time for each of the VMs, wherein predicting a total backup time for a VM comprises predicting an amount of time to prepare the VM for backup and an amount of time to backup the VM;
predict a cost metric for failing to backup each of the VMs in the time window, the cost metric corresponding to a service level agreement (SLA) of each of the VMs;
determine an optimal set of the VMs to backup during the time window based on the predicted total backup times and predicted cost metrics for each of the VMs, wherein the VMs in the optimal set have an aggregated predicted total backup time that equals or exceeds the time window, and the optimal set of the VMs has a largest size and a lowest total predicted cost metric among all sets of the VMs having an aggregated predicted total backup time that equals or exceeds the time window; and
back up one or more of the VMs in the optimal set during the time window.

16. The system of claim 15, wherein the data backup server predicts a total backup time for a VM by:
predicting a snapshot time of the VM;
predicting a size of changed blocks for the VM;
predicting a transfer time for the VM based on the size of the changed blocks; and
generating the total backup time for the VM by combining the transfer time and snapshot time for the VM.

17. The system of claim 15, wherein the data backup server predicts a cost metric for failing to backup a VM by generating the cost metric by combining a plurality of factors including the total time for backing up the VM.

18. The system of claim 17, wherein the plurality of factors further includes:
a priority of the VM;
a priority of a customer that owns the VM;
an amount of time since a last backup scheduled backup window;
a flag indicating whether or not the backup is a first time backup or an incremental backup; and
a failure rate of backing up the VM.

19. The system of claim 15, wherein the data backup server determines an optimal set of VMs to backup by:
(a) generating a candidate set of the VMs that meets a plurality of constraints;
(b) computing a total cost metric of the VMs in the candidate set;
(c) comparing the candidate set to a saved set having a size and a total cost metric; and
(d) saving the candidate set if the candidate set has a size that is larger and a total cost metric that is lower than the size and the total cost metric, respectively, of the saved set; and
(e) returning the saved set as a current optimal set and repeating steps (a) through (e) for all sets of the VMs that meet the constraints.

20. The system of claim 15, wherein the data backup server backs up the VMs in the optimal set by:
assigning a VM as a backup agent for the VM;
creating a current backup snapshot for the VM;
examining a previous backup snapshot to determine changed blocks of the VM; and
updating a backup image of the VM with the changed blocks.

* * * * *